United States Patent
Homma et al.

(10) Patent No.: US 7,085,901 B2
(45) Date of Patent: Aug. 1, 2006

(54) STORAGE APPARATUS AND METHOD FOR OPTIMAL SNAPSHOT TRANSFER

(75) Inventors: Sigeo Homma, Odawara (JP); Haruaki Watanabe, Isehara (JP); Yoichi Mizuno, Yokohama (JP); Atsushi Tanaka, Saitama (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 10/627,575

(22) Filed: Jul. 25, 2003

(65) Prior Publication Data

US 2004/0168034 A1    Aug. 26, 2004

(30) Foreign Application Priority Data

Feb. 26, 2003    (JP) .............................. 2003-048483

(51) Int. Cl.
*G06F 12/16*    (2006.01)

(52) U.S. Cl. ...................................... 711/162; 707/204

(58) Field of Classification Search ................... None
See application file for complete search history.

(56) References Cited

U.S. PATENT DOCUMENTS

| | | | |
|---|---|---|---|
| 5,555,389 A | 9/1996 | Satoh et al. | |
| 5,649,152 A | 7/1997 | Ohran et al. | |
| 5,819,310 A * | 10/1998 | Vishlitzky et al. | 711/114 |
| 5,845,295 A | 12/1998 | Houseman et al. | |
| 5,987,566 A * | 11/1999 | Vishlitzky et al. | 711/114 |
| 6,052,797 A * | 4/2000 | Ofek et al. | 714/6 |
| 6,108,748 A * | 8/2000 | Ofek et al. | 711/112 |
| 6,189,079 B1 * | 2/2001 | Micka et al. | 711/162 |
| 6,351,792 B1 * | 2/2002 | Milillo | 711/162 |
| 6,370,626 B1 * | 4/2002 | Gagne et al. | 711/154 |
| 6,408,366 B1 * | 6/2002 | Lorenz et al. | 711/156 |
| 6,408,369 B1 * | 6/2002 | Garrett et al. | 711/165 |
| 6,694,413 B1 | 2/2004 | Mimatsu et al. | |
| 2002/0103980 A1 * | 8/2002 | Crockett et al. | 711/162 |
| 2002/0129214 A1 | 9/2002 | Sarkar | |
| 2002/0188815 A1 * | 12/2002 | Wang et al. | 711/162 |
| 2003/0140070 A1 | 7/2003 | Kaczmarski et al. | |
| 2003/0204572 A1 | 10/2003 | Mannen et al. | |
| 2003/0212869 A1 | 11/2003 | Burkey | |

FOREIGN PATENT DOCUMENTS

EP    1 148 416    10/2001

* cited by examiner

*Primary Examiner*—Donald Sparks
*Assistant Examiner*—Matthew Bradley
(74) *Attorney, Agent, or Firm*—Mattingly, Stanger, Malur & Brundidge, P.C.

(57) ABSTRACT

A storage apparatus controls primary and secondary volumes as a pair, using a logical snapshot management table that indicates in which volume data to be accessed is retained to thereby enable an immediate access to a logical frozen image.

51 Claims, 15 Drawing Sheets

Fig. 3

| | Primary Volume BM (P) | | | | | | | Secondary Volume BM (S) | | | | | |
|---|---|---|---|---|---|---|---|---|---|---|---|---|---|
| | xp1 | xp2 | xp3 | | | | | xs1 | xs2 | xs3 | | | |
| yp1 | 0 | 0 | 0 | 0 | 0 | 0 | ys1 | 1 | 1 | 1 | 1 | 1 | 1 |
| yp2 | 0 | 0 | 0 | 0 | 0 | 0 | ys2 | 1 | 1 | 1 | 1 | 1 | 1 |
| yp3 | 0 | 0 | 0 | 0 | 0 | 0 | ys3 | 1 | 1 | 1 | 1 | 1 | 1 |
| | 0 | 0 | 0 | 0 | 0 | 0 | | 1 | 1 | 1 | 1 | 1 | 1 |
| | 0 | 0 | 0 | 0 | 0 | 0 | | 1 | 1 | 1 | 1 | 1 | 1 |

| State before Execution BM (P, S) | Access to Primary Volume | | Access to Secondary Volume | |
|---|---|---|---|---|
| | Read | Write | Read | Write |
| (0, 0) | (0, 0) | (0, 0) | (0, 0) | (0, 0) |
| (0, 1) | (0, 1) | (0, 0) | (0, 0) | (0, 0) |
| (1, 0) | (0, 0) | (0, 0) | (1, 0) | (0, 0) |
| (1, 1) | N/A | | | |

Fig. 11

| State before Execution (P, S) | State after receiving Snap command | State after receiving Restore command |
|---|---|---|
| (0, 0) | (0, 1) | (1, 0) |
| (0, 1) | (0, 1) | (0, 1) |
| (1, 0) | (1, 0) | (1, 0) |
| (1, 1) | N/A ||

Fig. 15

| State before Execution (P, S) | State after receiving Delete command |
|---|---|
| (0, 0) | (0, 0) |
| (0, 1) | (0, 1) |
| (1, 0) | (1, 0) |
| (1, 1) | N/A |

STORAGE APPARATUS AND METHOD FOR OPTIMAL SNAPSHOT TRANSFER

BACKGROUND OF THE INVENTION

1. Field of the Invention

The present invention relates to a storage apparatus and a method for managing the storage apparatus.

2. Related Background Art

Data stored in storage apparatuses used in computer systems is periodically stored on magnetic tapes as backup data, so that data lost due to apparatus failure or operation error can be recovered. Backup data, in addition to being stored as backup, is used as data for batch processing and/or test data for application programs.

It is important that the backup data thus utilized is data of a specific point in time and that this can be guaranteed. When a part of data is updated during a backup processing, the data loses consistency.

A processing to obtain backup data involves repeating data copy processing, which requires a long time. The loss of data consistency can be prevented by halting all processing other than the backup processing, thereby preventing any data from being updated; however, a suspension of any processing for long periods of time cannot be allowed on systems that perform online processing.

Mirroring is known as a technology to obtain backup data (first technology). Mirroring is a technology to physically duplicate volumes within a storage apparatus. A copy processing is conducted in order to achieve consistency of data between the volumes. When data is updated during the copy processing, data in both of the volumes are updated. Backup data is obtained in this way according to a mirroring technique.

According to another known method to obtain backup data, when data is updated during a backup processing, data to be updated is saved in a different region before the data is actually updated (second technology). In the backup processing, the saved data can be backed up instead of the updated data.

Another method to obtain backup data is a method in which, in addition to volumes containing data to be backed up (primary volumes), virtual auxiliary volumes having a primary-secondary relation with the primary volumes are provided, such that when data in the primary volumes is updated during a backup processing, the data to be updated is saved in the auxiliary volumes (third technology). The backup processing for the updated data is the same as in the second technology.

The marked difference among the technologies described above is that, while the point at which copy generation is completed and thereafter is considered the specific point in time according to the first technology, the point at which data save begins is considered the specific point in time according to the second and third technologies.

Data of a certain point in time such as backup data is called frozen image data, or simply a frozen image. Frozen images are also sometimes called snapshots. In addition to being stored as backup data, frozen images are used in application programs such as batch processing programs. Such application programs must sometimes be executed during the execution of online programs, and generating frozen images is an extremely important task especially in computer systems that operate 24 hours a day.

In such usage environment for computer systems, the first technology requires time for copying data that cannot be allowed on such computer systems, as described above. Furthermore, due to the fact that obtaining and using frozen images according to the first technology are limited to at or after copy generation is completed, there are limitations in selecting a specific point in time from the prospective of the computer that instructs frozen image generation.

On the other hand, according to the second and third technologies, the specific point in time is when a host computer instructs the generation of frozen images and data save begins. When storing frozen images as backup data, another copy processing is required according to the second and third technologies. During this copy processing, control load becomes concentrated on the storage apparatus, which can impact response time for online programs.

SUMMARY OF THE INVENTION

In view of the above, the present invention relates to a storage apparatus, as well as its control method, having the convenience of obtaining backup data without causing an enormous load on the storage or a host computer, even in diverse usage environments for the host computer.

The present invention also relates to a storage apparatus, as well as its control method, with reduced impact on a host computer's operating status.

In accordance with an embodiment of the present invention, a logical snapshot management table that indicates the location of data to be accessed is provided, which makes it possible to transfer a current state with a single command to a state in which a logical frozen image (i.e., a snapshot) can be used immediately.

Other objects, features and advantages of the invention will become apparent from the following detailed description taken in conjunction with the accompanying drawings.

BRIEF DESCRIPTION OF THE DRAWINGS

FIG. 3 shows a diagram of one example of a logical snapshot management table in accordance with an embodiment of the present invention.

FIG. 11 shows a diagram of changes to the logical snapshot management table with receipt of control commands in accordance with an embodiment of the present invention.

FIG. 15 shows a diagram indicating status of the logical snapshot management table before and after the execution of a delete command in accordance with an embodiment of the present invention.

DESCRIPTION OF PREFERRED EMBODIMENTS

The following is a detailed description of an embodiment of the present invention with references to drawings.

Figure 1:
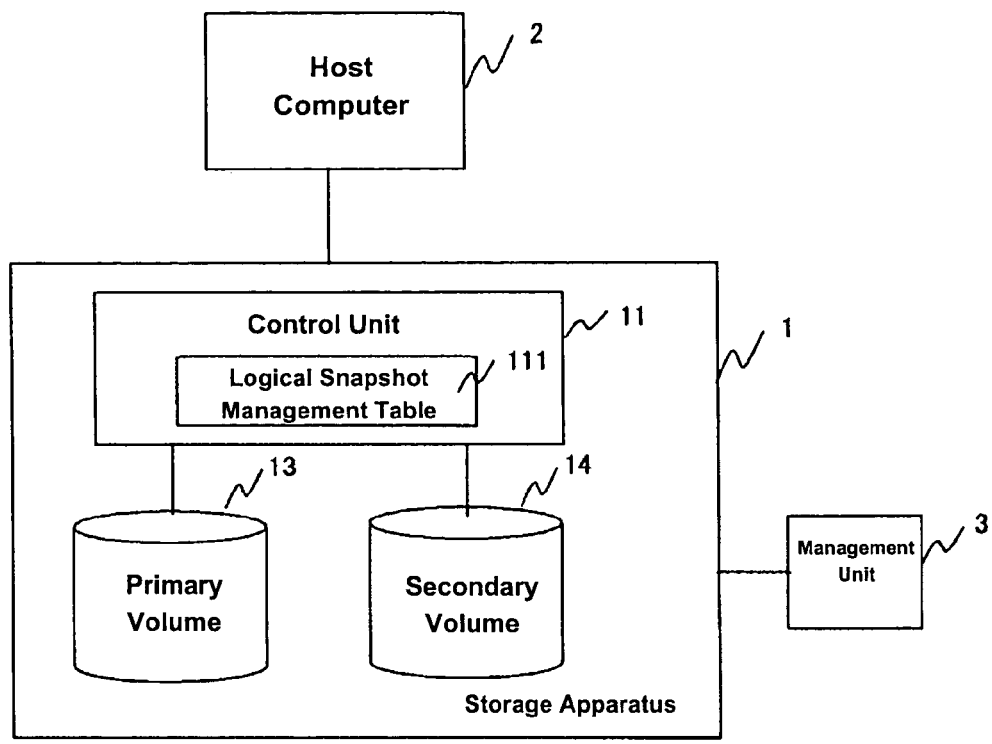
FIG. 1 is a diagram of the configuration of a storage apparatus in accordance with an embodiment of the present invention.

FIG. 1 shows a diagram of the configuration of a system in accordance with a first embodiment of the present invention. In FIG. 1, a storage apparatus 1 connected to a host computer 2 and a management apparatus 3. The storage apparatus 1 includes a control unit 11, a primary volume 13, and a secondary volume 14. The control unit 11 has a processor and a memory, both not shown, and executes events that occur internally, various commands from the host computer 2, and access (read/write) instructions to the primary volume 13 and/or the secondary volume 14, as it refers to information in the memory. As part of information in memory regions is a logical snapshot management table 111 according to the present embodiment example. Every processing according to the present embodiment example that is described using a flowchart is executed in the control unit 11.

Although the host computer 2 is directly connected to the storage apparatus 1 in FIG. 1, they may be connected via a network. The host computer 2 is a computer such as a file server, personal computer or workstation, and it can be a plurality of such computers. The management apparatus 3 is an apparatus for defining or altering the configuration of the storage apparatus 1, and its functions may be incorporated into a computer. According to the present embodiment example, control commands, described in detail later, issued by the host computer 2 can instead be issued by the management apparatus 3. Furthermore, commands and instructions that can be issued from the host computer 2 to the storage apparatus 1 can be set up to be issued from the management apparatus 3 as well.

Both the primary volume 13 and the secondary volume 14 can either be physical volumes or logical volumes. According to the present embodiment example, they may be either as long as the primary volume 13 and the secondary volume 14 form a set. The set does not have to be a set having a one-to-one relationship, but it can instead be a set having a 1: n relationship; in other words, a plurality of secondary volumes 14 can be correlated to a single primary volume 13. Furthermore, there may be three volumes having a cascade arrangement, where a first volume is a first primary volume, a second volume is a secondary volume for the first primary volume as well as a second primary volume, and a third volume is a second secondary volume. In the present embodiment, a situation in which there is one secondary volume 14 that is correlated to the primary volume 13 will be described for the sake of simplification. The set of the primary volume 13 and the secondary volume 14 correlated are called a pair of volumes.

As one example, the primary volume 13 according to the present embodiment example is accessed by application programs, such as an online program executed in the host computer 2. The secondary volume 14 is accessed by a backup program executed in the host computer 2. The uses of the primary volume 13 and the secondary volume 14 can be differentiated based on the purpose of the host computer 2 or among a plurality of the host computers 2.

The primary volume 13 and the secondary volume 14 may also be called a first volume and a second volume, respectively, or a first storage region and a second storage region, respectively.

Figure 2:
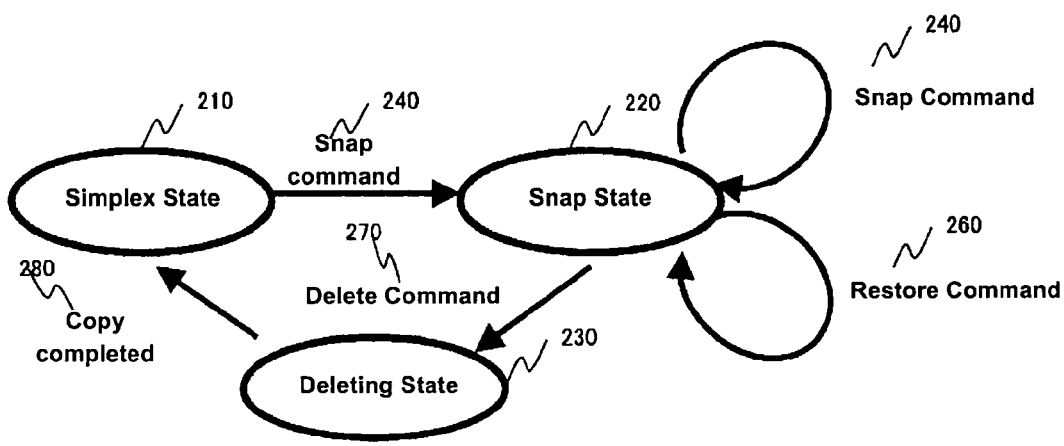
FIG. 2 is a diagram of status transfer between states available to the storage apparatus in accordance with an embodiment of the present embodiment.

FIG. 2 is a status transfer diagram that illustrates an overview of the control by the storage apparatus 1 according to the present embodiment example. The storage apparatus 1 has three states, namely a simplex state 210, a snap state 220, and a deleting state 230, as shown in FIG. 2. The control status varies for each pair of volumes in the storage apparatus 1 having a plurality of pairs of volumes. In the present example, there is only one pair of volumes in the storage apparatus 1 for the sake of simplification.

As arrows in FIG. 2 indicate, the control unit 11 controls transfers among various states according to operations of the storage apparatus 1 or commands. In the present embodiment example, each state is controlled in units of volumes (although it may be in units of files or other units), and there is one pair of the primary volume 13 and the secondary volume 14 in the storage apparatus 1, for the sake of simplification. The following is a description of the three states in FIG. 2. The simplex state 210 is a state in which the primary volume 13 and the secondary volume 14 are independent of each other. For example, this is a state in which an access to the first storage region (i.e., the primary volume 13) by an application program (e.g., an online program) of the host computer 2 and an access to the second storage region (i.e., the secondary volume 14) by another application program (e.g., a batch processing program such as for backup) can be executed without any relation to each other. Due to the fact that, strictly speaking, there is no primary-secondary relationship between these volumes in the simplex state 210, the expressions "the first and second storage regions" are used instead.

The snap state 220 is a state in which the primary volume 13 and the secondary volume 14 form a pair and have a primary-secondary (i.e., master-slave) relationship in terms of control; this state will be described in detail later.

The deleting state 230 is a transitional state in a transfer from the snap state 220 to the simplex state 210. This state will also be described in detail later, in conjunction with the snap state 220.

According to the present embodiment example, three kinds of control commands, namely a snap command 240, a restore command 260 and a delete command 270, are issued by the host computer 2 to the storage apparatus 1 to be executed by the control unit 11 of the storage apparatus 1.

The snap command 240, as FIG. 2 indicates, is a command to shift the first and second storage regions into the snap state 220. When the snap command 240 is executed in the simplex state 210, the first and second storage regions form a pair and transfer to the snap state 220. When the snap command 240 is executed in the snap state 220, the pair of volumes maintains the snap state 220.

The restore command 260, although described in detail later, is a command issued to manipulate data between the primary volume 13 and the secondary volume 14 in the snap state 220, and as indicated in FIG. 2, does not cause the pair of volumes to transfer between states.

The delete command 270 is indicated in FIG. 2 as a command that causes a transfer from the snap state 220 to the deleting state 230; however, since the deleting state 230 is a transitional state, the delete command 270, as viewed from the host computer 2 that issues the delete command 270, is a command that causes the pair of volumes to transfer from the snap state 220 to the simplex state 210.

The deleting state 230 may be made into a state that is not transitional; by making this state of the storage apparatus 1 ascertainable by the host computer 2 and by providing a new command, the status of the storage apparatus 1 can be transferred from the non-transitional deleting state 230 to the simplex state 210.

FIG. 3 is the logical snapshot management table 111 indicated as a bitmap. The logical snapshot management table 111 does not have to be a bitmap shown as an example in the present embodiment example, and it can instead be a list or pointers indicating physical addresses, as long as such formats allow management or control of correlation of the primary volume 13 with the secondary volume 14, described below, as management information or control information. A pair formed by the primary volume 13 and the secondary volume 14 managed in the logical snapshot management table 111 is the pair of volumes referred to earlier.

The logical snapshot management table 111 is created with the transfer of the storage apparatus I from the simplex state 210 to the snap state 220, which results from the execution of the snap command 240. The logical snapshot management table 111 is released with the transfer of the storage apparatus 1 to the simplex state 210, which results from the execution of the delete command 270. By referring to the logical snapshot management table 111, the location (i.e., physical address) of data to be accessed can be obtained.

A primary volume BM (P) 300 indicates retention status of data in the primary volume 13, while a secondary volume BM (S) 301 indicates retention status of data in the secondary volume 14. Data in the primary volume 13 indicated by (xp 1, yp 1), which are coordinates added to FIG. 3 to aid in description, in the primary volume BM (P) 300 correspond to a storage region of the secondary volume 14 indicated by (xs1, ys1) in the secondary volume BM (S) 301. Data represented by each of the bits in the primary volume BM (P) 300 and the secondary volume BM (S) 301 is in units of blocks or tracks; for example, if data are in units of tracks, the coordinates (xp1, yp1) in the primary volume BM (P) 300 and (xs1, ys1) in the secondary volume BM (S) 301 indicate data status of a track uniquely specified by a cylinder number xp1 and a head number yp1 of the primary volume 13, and data status of a track uniquely specified by a cylinder number xs1 and a head number ys1 of the secondary volume 14, respectively.

FIG. 3 indicates contents of the logical snapshot management table 111 immediately after, for example, the snap command 240 is executed in the simplex state 210 and the storage apparatus 1 is transferred to the snap state 220. At this time, contents stored in the primary volume 13 are stored virtually in the secondary volume 14 as a snapshot, or a frozen image. In other words, the contents are managed with the bitmap as if the snapshot of the contents exists virtually in the secondary volume 14, such that the snapshot can be accessed by accessing the secondary volume 14.

By using the bitmap, which is one example of the logical snapshot management table 111, the location of data to be accessed can be found. In the present embodiment example in which the secondary volume 14 and the primary volume 13 have a 1:1 relationship, "0" in the bitmap indicates that there is data in the corresponding region of the corresponding volume, while "1" in the bitmap indicates that there is no data in the corresponding region of the corresponding volume.

In the state shown in FIG. 3, all data to be accessed are therefore in the primary volume 13. By storing data in this frozen state at a certain point in time on a storage medium such as a magnetic tape, a backup of that point in time (i.e., a point in time immediately after the storage apparatus 1 is transferred from the simplex state 210 to the snap state 220) can be made.

Figures 4, 5:
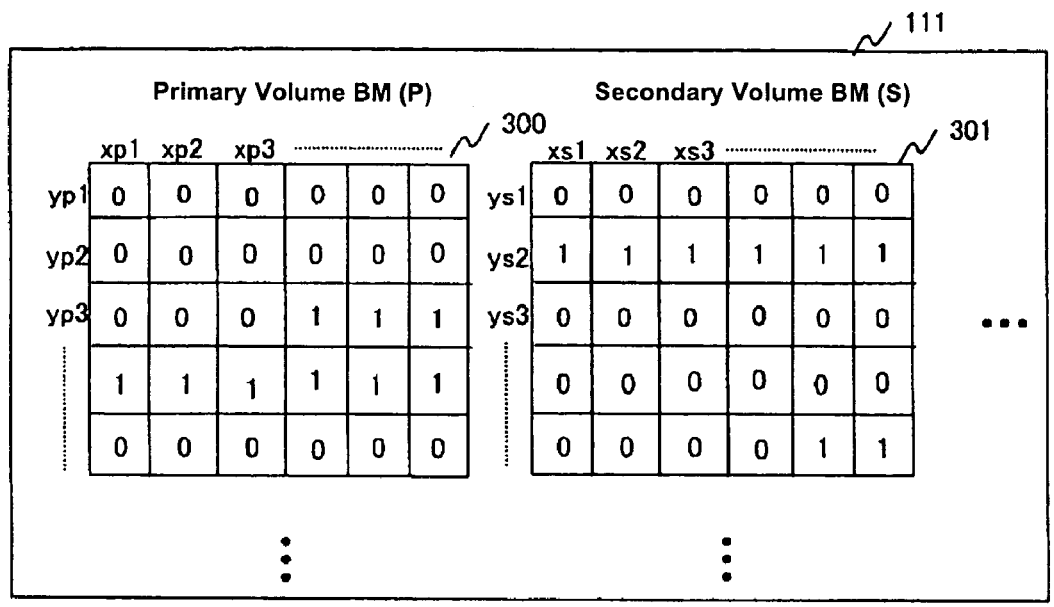
FIG. 4 shows a diagram of one example of a logical snapshot management table in accordance with an embodiment of the present invention.
FIG. 5 shows a diagram of changes to the logical snapshot management table with access processing in accordance with an embodiment of the present invention.

FIG. 4 indicates one example of changes to contents of the logical snapshot management table 111 that occur with changes in the location of data to be accessed in the snap state 220, described below.

The logical snapshot management table 111 is important as control information provided in the memory of the control unit 11; if the memory is a volatile memory, a backup of the logical snapshot management table 111 must be made on a nonvolatile memory.

In the following description, the relationship between the value (0 or 1) of (xpi, ypj) of the primary volume BM (P) 300 and the value (0 or 1) of (xsi, ysj) of the secondary volume BM (S) 301 is described as BM (P, S). i and j represent 1, 2, 3, etc., where the upper limit is a value determined by the size of the corresponding volume. Further in the following description, changes in the BM (P, S) result from accesses and commands from the host computer 2. Such changes occur on each cluster of data managed by each bit on the bitmap. Consequently, the size of data on which a change occurs is not necessarily the same as the size of data accessed by the host computer 2.

In the snap state 220, the bitmap changes based on access (read/write) instructions or control commands from the host computer 2 to the primary volume 13 and/or the secondary volume 14. The following is a description of changes to the bitmap.

FIG. 5 indicates as a change in BM (P, S) of the logical snapshot management table 111 the changes in retention status of data in the primary volume 13 and the secondary volume 14 according to accesses (read/write) from the host computer 2 to the primary volume 13 or the secondary volume 14. The status before execution in FIG. 5 shows BM (P, S) before a read or write access takes place, while the status after execution of an access processing indicates BM (P, S) after the read or write processing is completed.

There are four states of BM (P, S), namely (0, 0), (0, 1), (1, 0) and (1, 1); however, a state in which BM (P, S)=(1, 1), which indicates a situation in which data to be accessed does not exist in either the primary volume 13 or the secondary volume 14, is not possible according to be present embodiment example. Specifically in the present embodiment example, if an access or a command is received from the host computer 2 in a state BM (P, S)=(1, 1), an error report signifying the rejection of such access or command will be sent to the host computer 2.

First, a situation in which an access occurs when BM (P, S)=(0, 1) in FIG. 5 is described. BM (P, S)=(0, 1) is a state that can occur, for example, immediately after the pair of volumes transfers to the snap state 220 when the snap command 240 is executed in the simplex state 210. Even if a read processing performed on the primary volume 13 is executed in this state, i.e., even if data is read from an address designated in a read instruction from the host computer 2 and the data is sent to the host computer 2, the state BM (P, S)=(0, 1) is maintained since the data retention status of neither the primary volume 13 nor the secondary volume 14 changes.

Figure 6:
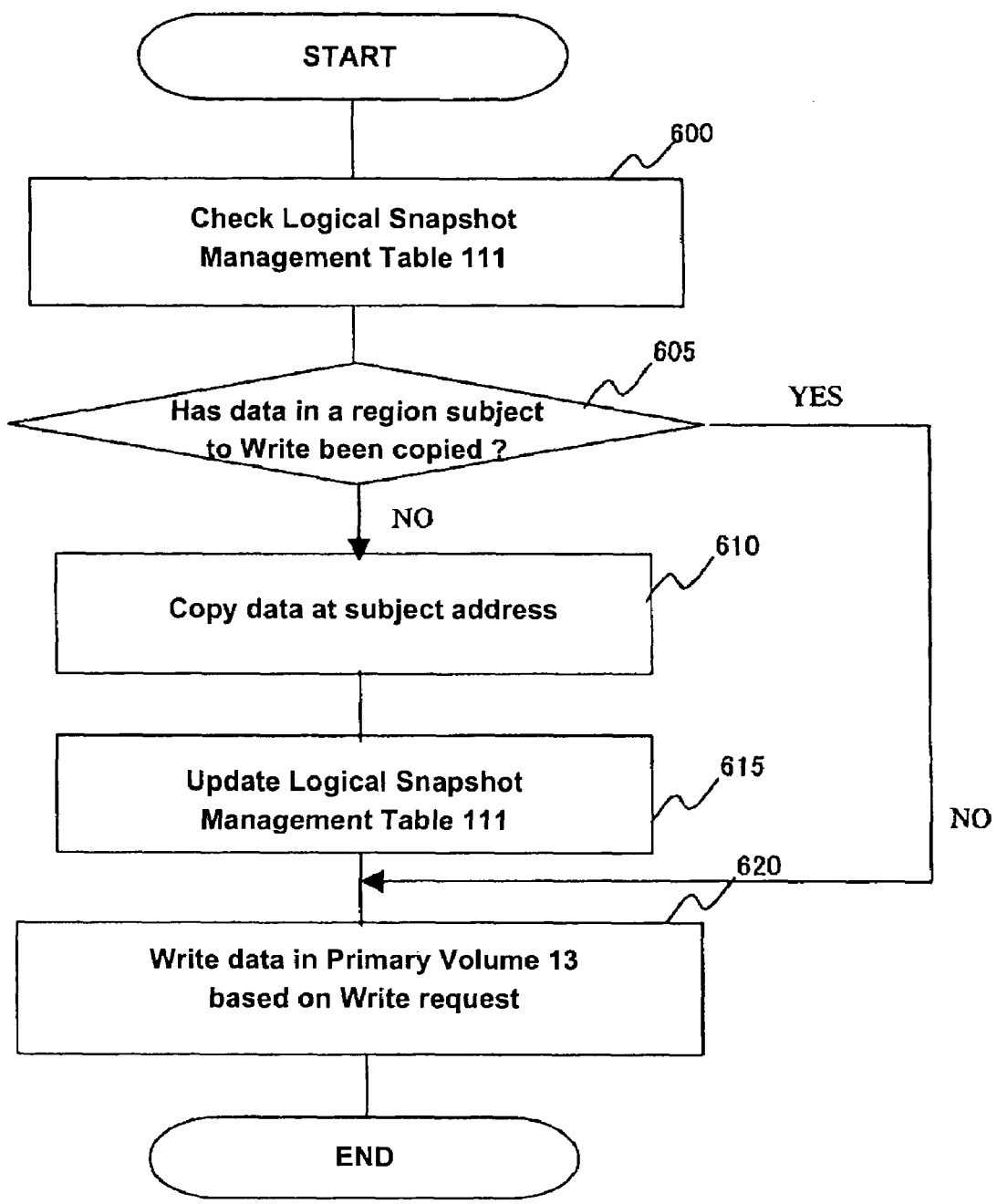
FIG. 6 shows a flowchart for updating a primary volume in accordance with an embodiment of the present invention.

A write processing performed on the primary volume 13 in the state BM (P, S)=(0, 1) in FIG. 5 is described using FIG. 6. When a write instruction is issued from the host computer 2 to the primary volume 13, the control unit 11 checks the BM (P, S) on the logical snapshot management table 111 that corresponds to a region of the primary volume 13 specified in the write instruction (step 600). Since BM (P, S)=(0, 1), which means there is no data to be accessed in the secondary volume 14 (NO in step 605), data in the region specified in the primary volume 13 is copied to the corresponding region of the secondary volume 14 (step 610). When the copying is completed, the logical snapshot management table 111 is updated from BM (P, S)=(0, 1) to BM (P, S)=(0, 0) (step 615). After this processing, data instructed in the write instruction is written to a designated region of the primary volume 13 (step 620).

In the write processing performed on the primary volume 13 in the state BM (P, S)=(0, 1), before data (new data) is written to the primary volume 13, data (old data) that was stored in the same region is saved (copied) to a corresponding region of the secondary volume 14. Consequently, although the primary volume 13 is updated to the new data upon the completion of the write processing, the old data is stored in the secondary volume 14, such that the data as of the point in time of the frozen image remains stored.

When the size of data region (for example, in units of tracks) managed by each bit in the logical snapshot management table 111 is larger than or equal to the size of data to be written (new data), the bit is the subject of the write processing; on the other hand, if the size of data to be written is larger, the corresponding plurality of bits is the subject of the write processing.

In the description of FIG. 6, the starting point was the state BM (P, S)=(0, 1); however, when the starting point is the state BM (P, S)=(1, 0), the direction of data copying in step 605 and step 610 is in the opposite direction. This will be described later.

Figure 7:
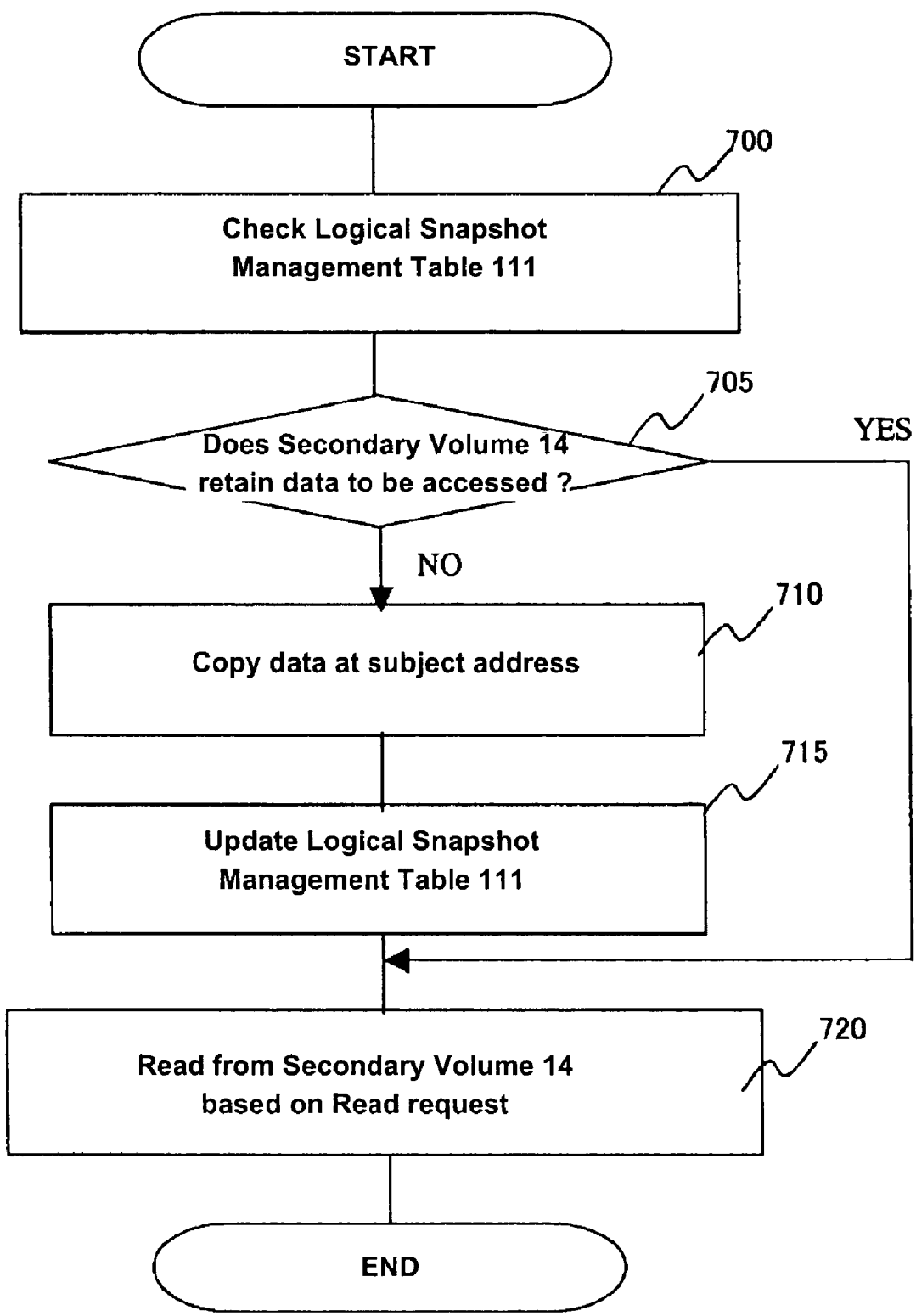
FIG. 7 shows a flowchart for reading from a secondary volume in accordance with an embodiment of the present invention.

A read processing performed on the secondary volume 14 in the state BM (P, S)=(0, 1) in FIG. 5 is described using FIG. 7. When a read instruction is issued from the host computer 2 to the secondary volume 14, the control unit 11 checks the BM (P, S) on the logical snapshot management table 111 that corresponds to a region of the secondary volume 14 specified in the read instruction (step 700). Since BM (P, S)=(0, 1), which means that there is no data to be accessed in the secondary volume 14 (step 705) and that the data to be accessed is instead in the corresponding region of the primary volume 13, the valid data in the primary volume 13 is copied to the corresponding region of the secondary volume 14 (step 710). Next, the logical snapshot management table 111 is updated from BM (P, S)=(0, 1) to BM (P, S)=(0, 0) (step 715). Next, the data copied to be applicable region of the secondary volume 14 is read (step 720) and sent to the host computer 2.

In FIG. 7, when there is no data in the applicable region of the secondary volume 14, the data copied to the secondary volume 14 is read and sent to the host computer 2 according to the present embodiment example. However, since the data is read from the primary volume 13 to the control unit 11 during the copy operation, the data can be sent to the host computer 2 at this point instead. This would shorten the response time for the read instruction from the perspective of the host computer 2. A similar processing with a copy operation in response to a read instruction is described below, and the response time can similarly be shortened through the processing described above.

When there is data in the applicable region of the secondary volume 14 (BM (P, S)=(0, 0) or BM (P, S)=(1, 0)), the processing branches off from step 705 to step 720, where the data is read and sent to the host computer 2.

Figure 8:
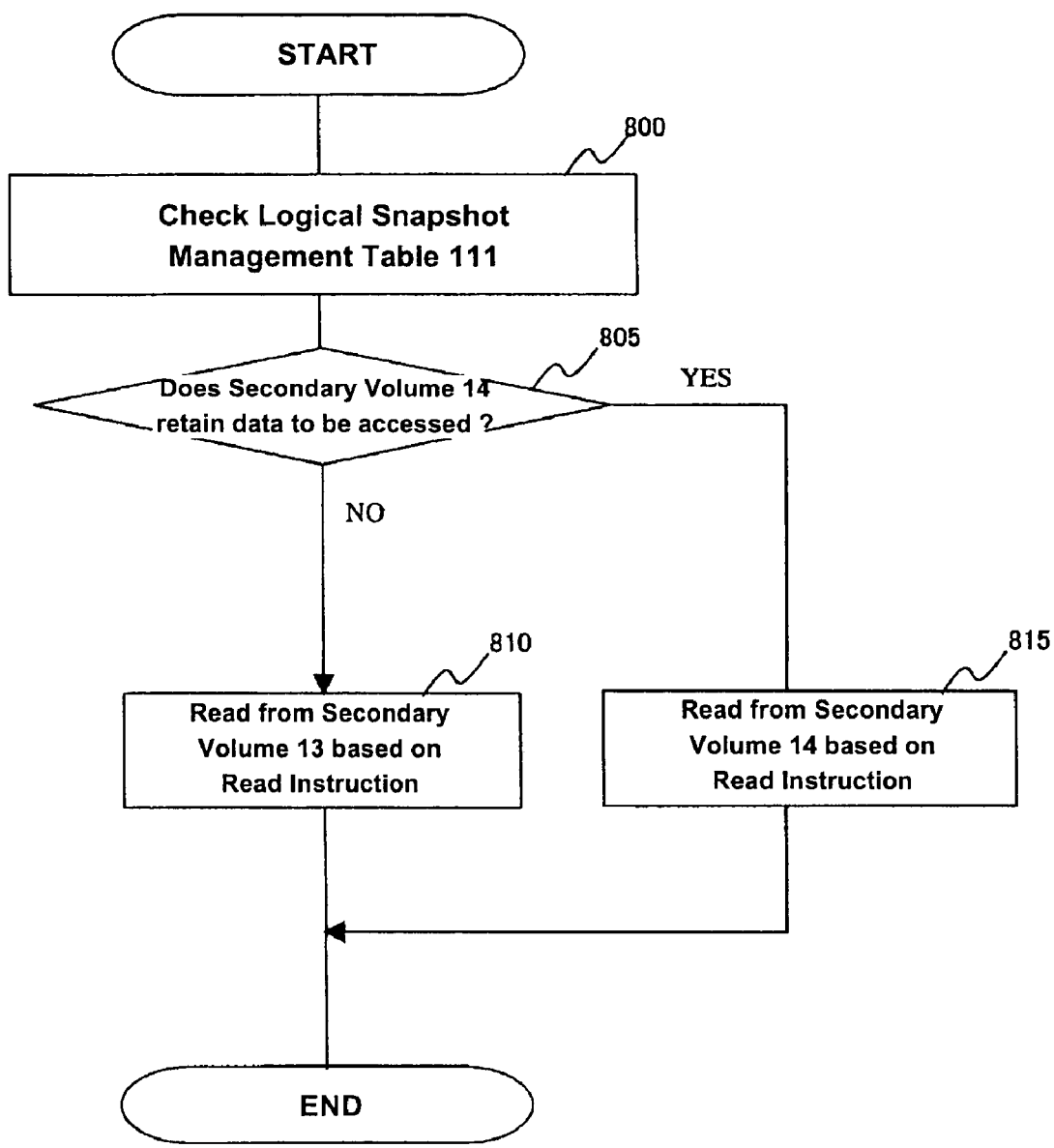
FIG. 8 shows a flowchart for reading from the secondary volume in accordance with an embodiment of the present invention.

When there is no data to be accessed in the secondary volume 14 in the processing illustrated in FIG. 7, the processing may omit copying of data in the corresponding region of the primary volume 13 to the secondary volume 14. This processing is described using FIG. 8. Step 800 and step 805 in FIG. 8 are identical to step 700 and step 705, respectively, in FIG. 7, and their descriptions are therefore omitted. In step 805, if there is no data in a region of the secondary volume 14 specified in a read instruction ((BM (P, S)=(0, 1)), data in the corresponding region of the primary volume 13 is read (step 810) and sent to the hose computer 2. On the other hand, if there is data to be accessed in the applicable region of the secondary volume 14 (BM (P, S)=(0, 0) or BM (P, S)=(1, 0)), data in the applicable region of the secondary volume 14 is read (step 815) and sent to the hose computer 2.

The processing in FIG. 8 is the same as the processing in FIG. 7 in terms of keeping a backup. In the processing in FIG. 8, of the data in the primary volume 13, the data copied to the secondary volume 14 consists only of old data in regions updated after the snap command 240 is received and data in the secondary volume 14 updated after the snap command 240 is received; consequently, the capacity of the secondary volume 14 can be small. In other words, a corresponding region does not have to be secured in the secondary volume 14 for data whose frozen image is stored in the primary volume 13. Specifically, the capacity of the secondary volume 14 can be determined by using a statistical prediction method that takes into account the purpose of the secondary volume 14 in order to reduce the capacity. Alternatively, a small capacity for the secondary volume 14 can be realized by securing regions as necessary every time a copy must be made to the secondary volume 14.

It is desirable to select between the processing in FIG. 7 and 8 based on the role of the storage apparatus 1, i.e., the purpose or function of the host computer 2. To that end, according to the present embodiment example, the control unit 11 has functions to perform both processing in FIGS. 7 and 8, thereby allowing a user to select one or the other through the host computer 2 or the management apparatus 3.

According to the present embodiment example, issuing a write instruction from the hose computer 2 to the secondary volume 14 is allowed even in the snap state 220.

Figure 9:
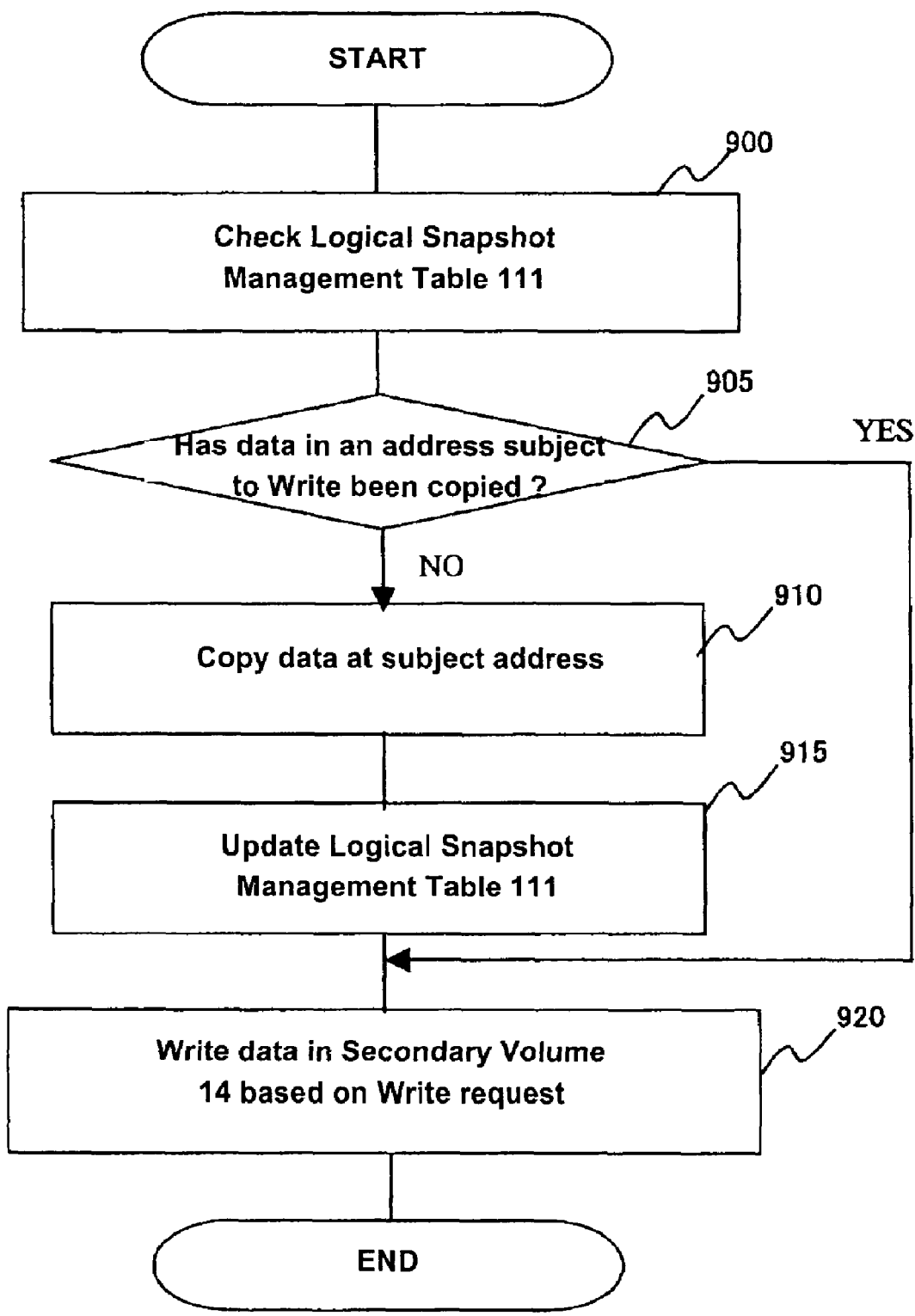
FIG. 9 shows a flowchart for updating the secondary volume in accordance with an embodiment of the present invention.

A write processing performed on the secondary volume 14 in the state BM (P, S)=(0, 1) in FIG. 5 is described using FIG. 9. When a write instruction is issued from the host computer 2 to the secondary volume 14, the control unit 11 checks the BM (P, S) on the logical snapshot management table 111 that corresponds to a region of the secondary volume 14 specified in the write instruction (step 900). Since BM (P, S)=(0, 1), which means that there is no data to accessed in the secondary volume 14 (step 905) and that the data to be accessed is instead in the corresponding region of the primary volume 13, the data in the primary volume 13 is copied to the corresponding region of the secondary volume 14 (step 910). Next, the logical snapshot management table 111 is updated from BM (P, S)=(0, 1) to BM (P, S)=(0, 0) (step 915). Next, the data instructed in the write instruction is written to the applicable region of the secondary volume 14 (step 920).

The reason for writing the data instructed in the write instruction over the data copied in the above processing is that, as described above, the size of data instructed in the write instruction is smaller than the size of data managed by the corresponding bit of the logical snapshot management table 111, which is a situation applicable to updating a part of the data copied. If the size of data instructed spans over a plurality of bits in the logical snapshot management table 111, the data is divided into sizes that correspond to various bits and the processing is executed for each bit.

If the size of data instructed in the write instruction and the size of data managed by the applicable bit in the logical snapshot management table 111 are equivalent, the copy processing in step 910 can be omitted.

If there is data to be accessed in the secondary volume 14 (BM (P, S) =(0, 0)), the processing branches off from step 905 to step 920 and the data instructed in the write instruction is written over the existing data.

By allowing the processing in FIG. 9, the execution of application program testing, including issuing write instructions to the secondary volume 14, and the execution of various programs in the host computer 2 using frozen image data become possible. One example of executing a program is a daily total processing for the day (i.e., various business statistical processing for one day) based on a frozen image at the time business operations of a financial institution ends for the day. In such application, processing is mainly read processing of volumes, but there may be write processing as well, such as in sort processing.

In the description of FIG. 9, the starting point was the state BM (P, S)=(0, 1); however, when the starting point is the state BM (P, S)=(1, 0), the direction of data copying in step 905 and step 910 is in the opposite direction. This will be described later.

The following is a description of a processing for an access to the primary volume 13 or the secondary volume 14 in the state BM (P, S)=(0, 0) in FIG. 5. As described using FIGS. 6 through 9, the state BM (P, S)=(0,0) is the snap state 220 upon a transfer from the simplex state 210 with the execution of the snap command 240, and is a state, for example, in which a write processing has been executed on the primary volume 13.

In the state BM (P, S)=(0, 0) in FIG. 5, there are four instruction issuing patterns for either a read instruction or a write instruction to either the primary volume 13 or the secondary volume 14. Due to the fact that data in both the primary volume 13 and the secondary volume 14 is valid in the state BM (P, S)=(0, 0), data remains valid not only in the read processing, in which data is maintained, but also in the write processing, in which data is updated to valid updated data; consequently, the logical snapshot management table 111 maintains the state BM (P, S) =(0, 0).

Of the processing in which the logical snapshot management table 111 does not change, the read processing performed on the primary volume 13 will be described later; however, in the write processing performed on the primary volume 13, since data in a region that is the subject of write is already copied to the secondary volume 14, the processing branches off from step 605 in FIG. 6; since an update to the logical snapshot management table 111 that manages status transfers is unnecessary, the processing branches off to step 620.

In the read processing performed on the secondary volume 14, due to the fact that the secondary volume 14 has data to be accessed (i.e., in the read processing) in step 705 of FIG. 7, the processing branches off to step 720 without any update to the logical snapshot management table 111. In FIG. 8 that indicates an alternative to the method shown in FIG. 7, it is obvious from the flowchart that an update processing performed on the logical snapshot management table 111 is not included.

In the write processing performed on the secondary volume 14, due to the fact that data in the region that is the subject of write has already been copied to the secondary volume 14, the processing branches off from step 905 in FIG. 9 to step 920 without any update to the logical snapshot management table 111.

Next, a processing for an access to the primary volume 13 or the secondary volume 14 in the state BM (P, S)=(1, 0) in FIG. 5 is described. The state BM (P, S)=(1, 0) is a state in which a restore command, described later, has been issued in the state BM (P, S)=(0, 0). The state BM (P, S)=(1, 0) indicates a state in which there is no data to be accessed in the primary volume 13 but there is data to be accessed in the secondary volume 14.

Figure 10:
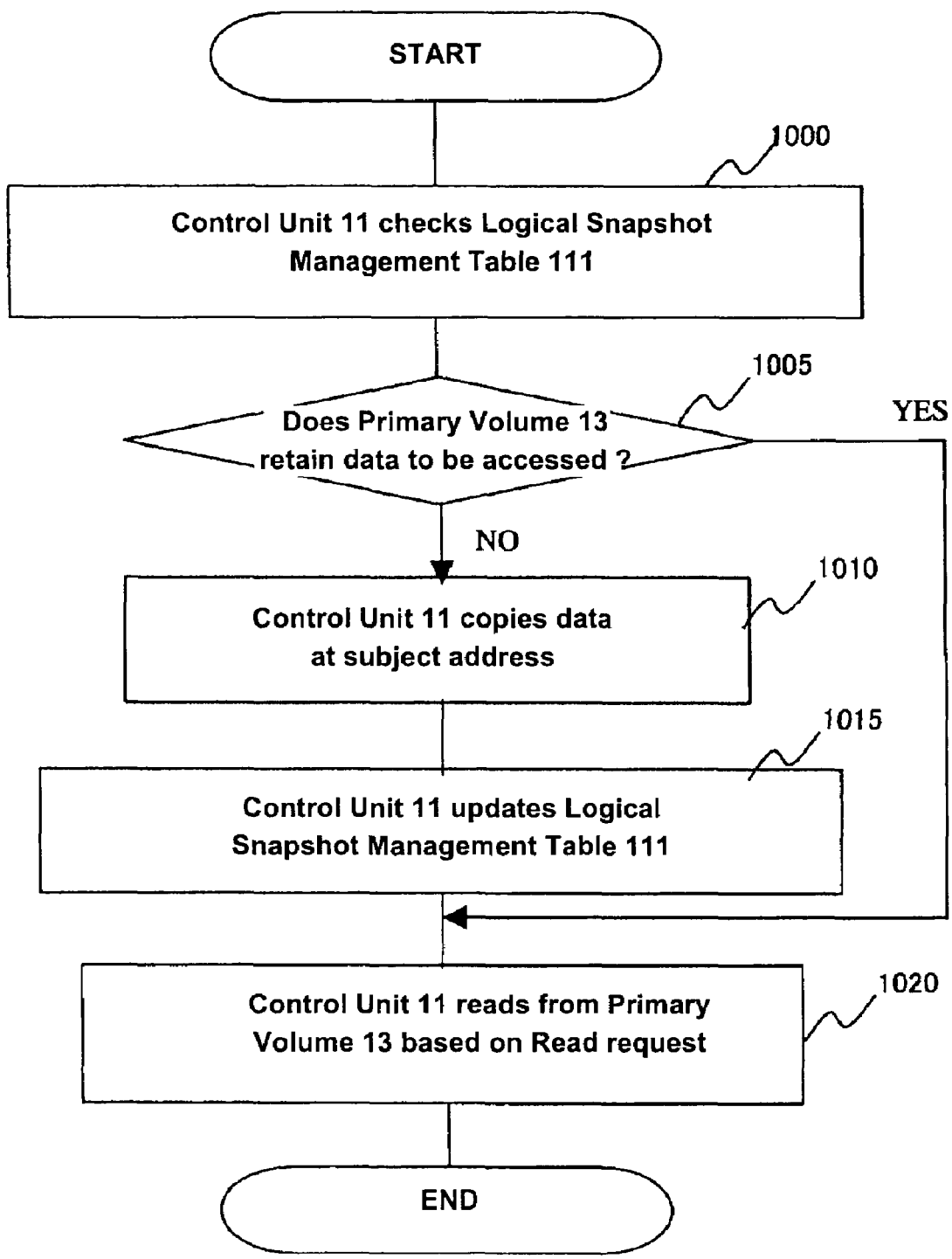
FIG. 10 shows a flowchart for reading from the primary volume in accordance with an embodiment of the present invention.

A read processing performed on the primary volume 13 in the state BM (P, S)=(1, 0) in FIG. 5 is described using FIG. 10. When a read instruction is issued from the host computer 2 to the primary volume 13, the control unit 11 checks the BM (P, S) on the logical snapshot management table 111 that corresponds to a region of the primary volume 13 specified in the read instruction (step 1000). Since BM (P, S)=(1, 0), which means that there is no data to be accessed in the primary volume 13 (step 1005) and that the data to be accessed is in the corresponding region of the secondary volume 14, the data is copied to the applicable region of the primary volume 13 (step 1010). Next, the logical snapshot management table 111 is updated from BM (P, S)=(1, 0) to BM (P, S)=(0, 0) (step 1015). Next, the data is read from the region of the primary volume 13 specified in the read instruction (step 1020) and sent to the host computer 2.

The read processing of data from the primary volume 13 in the state BM (P, S)=(0, 1) was described without using any drawings, while the description of a read processing of data from the primary volume 13 in the state BM (P, S)=(0, 0) has been withheld so far, but it should be easily understood that the processing in FIG. 10 that branches off from step 1005 to step 1020 is applicable to both cases.

A write processing performed on the primary volume 13 in the state BM (P, S)=(1, 0) in FIG. 5 is described using FIG. 6. As described earlier, the copy direction of data in FIG. 6 in this case is opposite the direction when the starting point is BM (P, S)=(0, 1). When a write instruction is issued from the host computer 2 to the primary volume 13 in the state BM (P, S)=(1, 0), the control unit 11 checks the BM (P, S) on the logical snapshot management table 111 that corresponds to a region of the primary volume 13 specified in the write instruction (step 600). Since BM (P, S =(1, 0), which means that data in the applicable region of the primary volume 13 is nonexistent, data in the corresponding region of the secondary volume 14 is copied to the applicable region of the primary volume 13 (step 610). Once the copying is completed, the logical snapshot management table 111 is updated from BM (P, S)=(1, 0) to BM (P, S)=(0, 0) (step 615). Next, the data instructed in the write instruction is written to the designated region of the primary volume 13 (step 620).

In a read processing performed on the secondary volume 14 in the state BM (P, S)=(1, 0) in FIG. 5, due to the fact that the secondary volume 14 has data to be accessed (i.e., in the read processing) in step 705 of FIG. 7, the processing branches off to step 720; in step 720, data is read from the address designated in the read instruction from the host computer 2 and the data is sent to the host computer 2 (step 720). In FIG. 8 that indicates an alternative to the method shown in FIG. 7, the processing branches off from step 805; data is read from the address designated in the read instruction and the data is sent to the host computer 2 (step 815).

A write processing performed on the secondary volume 14 in the state BM (P, S)=(1, 0) in FIG. 5 is described using FIG. 9. As described earlier, the copy direction of data in FIG. 9 in this case is opposite the direction when the starting point is BM (P, S)=(0, 1). When a write instruction is issued from the host computer 2 to the secondary volume 14 in the state BM (P, S)=(1, 0), the control unit 11 checks the BM (P, S) on the logical snapshot management table 111 that corresponds to a region of the secondary volume 14 specified in the write instruction (step 900). Since BM (P, S)=(1, 0), which means there is no data to be accessed in the primary volume 13, data in the applicable region of the secondary volume 14 is copied to the corresponding region of the primary volume 13 (step 910). Once the copying is completed, the logical snapshot management table 111 is updated from BM (P, S)=(1, 0) to BM (P, S)=(0, 0) (step 915). Next, the data instructed in the write instruction is written to the designated region of the secondary volume 14 (step 920).

It has been explained that there are three kinds of control commands, i.e., the snap command 240, the restore command 260 and the delete command 270, that are provided as commands issued by the host computer 2. As described earlier, due to the fact that the delete command 270 is a command that causes a transfer from the snap state 220 to the deleting state 230, it does not cause any change in the location of data to be accessed. When the snap command 240 or the restore command 260 is issued from the host computer 2 while the pair of volumes is in the snap state 220, the location of data to be accessed changes, although the snap state 220 is maintained.

If there is data to be accessed in the primary volume 13, the snap command 240 makes the corresponding data in the secondary volume 14 invalid and updates the logical snapshot management table 111 in such a way that the location of data to be accessed in the secondary volume 14 is the same as the location of data to be accessed in the primary volume 13. If there is data to be accessed only in the secondary volume 14, the snap command 240 maintains this state. The restore command 260 is a command provided from the host computer 2 to recover data when data in the primary volume 13 cannot be used for some reason, e.g., when the host computer 2 writes wrong data over correct data.

If there is data to be accessed in the secondary volume 14, the restore command 260 makes the corresponding data in the primary volume 13 invalid and updates the logical snapshot management table 111 in such a way that the location of data to be accessed in the primary volume 13 is the same as the location of data to be accessed in the secondary volume 14. If there is data to be accessed only in the primary volume 13, the restore command 260 maintains this state. The following is a description of changes in the location of such data to be accessed, followed by a description of a processing involving the delete command 270.

FIG. 11 indicates as a change in BM (P, S) of the logical snapshot management table 111 the changes in retention status of data in the primary volume 13 and the secondary volume 14 according to the snap command 240 or the restore command 260 issued from the host computer 2 to the primary volume 13 or the secondary volume 14. The status before execution in FIG. 11 shows BM (P, S) before receiving the snap command 240 or the restore command 260, while the status after receiving either command indicates BM (P, S) after receiving the snap command 240 or the restore command 260 and completing the designated processing.

There are three states of BM (P, S), namely (0, 0), (0, 1) and (1, 0). A state BM (P, S)=(1, 1) indicates a situation in which data to be accessed does not exist in either the primary volume 13 or the secondary volume 14, which is not possible according to be present embodiment example.

As the following description will make clear, when the snap command 240 or the restore command 260 is issued, the control unit 11 executes a processing on all data in the pair of volumes. Since the processing on data in the pair of volumes varies for each different type of BM (P, S) before execution, the processing for each type of BM (P, S) before execution is described below.

Figure 12:
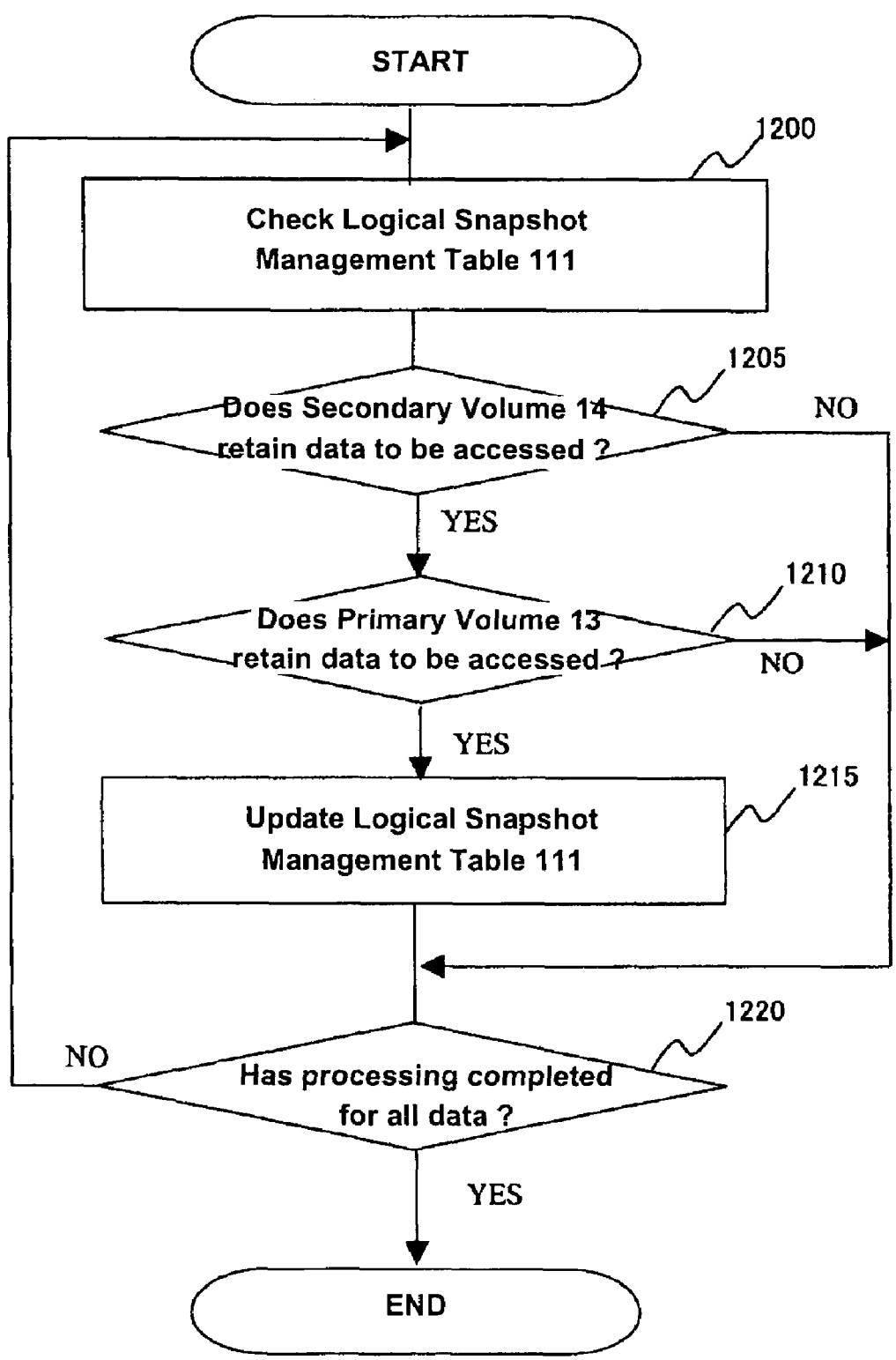
FIG. 12 shows a flowchart for executing a snap command in accordance with an embodiment of the present invention.

A processing that takes place when the snap command 240 is received in the state BM (P, S)=(0, 1) in FIG. 11 is described using FIG. 12. The state BM (P, S)=(0, 1) is a state, for example, that appears immediately after the pair of volumes transfers to the snap state 220 upon the execution of the snap command 240 in the simplex state 210, as described in FIG. 3. When the logical snapshot management table 111 is checked (step 1200), since there is no data to be accessed in the secondary volume 14 (step 1205), the processing branches off to step 1220.

In FIG. 12, initial settings for controlling a processing loop (i.e., a processing that branches off from step 1220 to step 1200) for checking all data managed in the logical snapshot management table 111 are omitted; however, whether the processing on all data has been completed is determined in step 1220, and the processing branches off to step 1200 if it has not been completed. Through this processing, the pair of volumes maintains the state BM (P, S)=(0, 1) when the snap command 240 is received in the state BM (P, S)=(0, 1).

Figure 13:
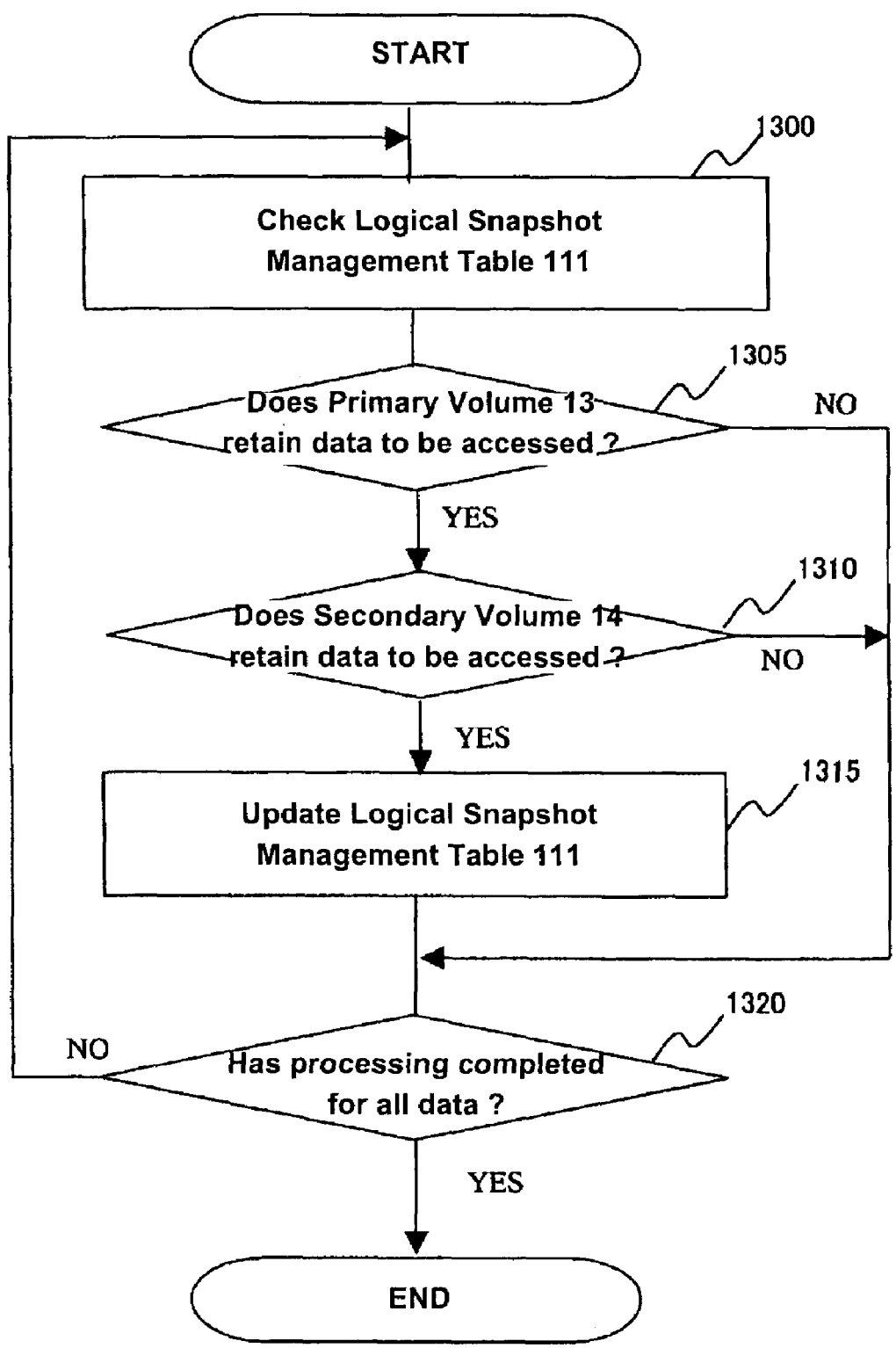
FIG. 13 shows a flowchart for executing a restore command in accordance with an embodiment of the present invention.

A processing that takes place when the restore command 260 is received in the state BM (P, S)=(0, 1) in FIG. 11 is described using FIG. 13. When the logical snapshot management table 111 is checked (step 1300), since there is data to be accessed in the primary volume 13 (step 1305) but there is no data to be accessed in the corresponding region of the secondary volume 14 (step 1310), the processing branches off to step 1320. Initial settings for controlling a processing loop (i.e., a processing that branches off from step 1320 to step 1300) for checking all data managed in the logical snapshot management table 111 are omitted also in FIG. 13; however, whether the processing on all data has been completed is determined in step 1320, and the processing branches off to step 1300 if it has not been completed. Through this processing, the storage apparatus 1 maintains the state BM (P, S)=(0, 1) when the restore command 260 is received in the state BM (P, S)=(0, 1).

A processing that takes place when the snap command 240 is received in the state BM (P, S)=(0, 0) in FIG. 11 is described using FIG. 12, with emphasis on parts different from those parts already described. When there is data to be accessed in the secondary volume 14 (step 1205) and the corresponding data in the primary volume 13 is valid (step 1210), the logical snapshot management table 111 is updated-from BM (P, S)=(0, 0) to BM (P, S)=(0, 1) (step 1215). This processing is repeated for all data (step 1220).

A processing that takes place when the restore command 260 is received in the state BM (P, S)=(0, 0) in FIG. 11 is described using FIG. 13, with emphasis on parts different from those parts already described. When the data in the primary volume 13 is valid until the restore command 260 is received (step 1305) and there is data to be accessed in the corresponding region of the secondary volume 14 (step 1310), the logical snapshot management table 111 is updated from BM (P, S)=(0, 0) to BM (P, S)=(1, 0) (step 1315). This processing is repeated for all data (step 1320).

A processing that takes place when the snap command 240 is received in the state BM (P, S)=(1, 0) in FIG. 11 is described using FIG. 12. When there is data to be accessed in the secondary volume 14 (step 1205) but there is no data to be accessed in the corresponding region of the primary volume 13 (step 1210), the processing branches off to step 1220. The state BM (P, S)=(1, 0) is maintained. This processing is repeated for all data (step 1220).

A processing that takes place when the restore command 260 is received in the state BM (P, S)=(1, 0) in FIG. 11 is described using FIG. 13. When there is no data to be accessed in the primary volume 13 (step 1305), the processing branches off to step 1320. The state BM (P, S)=(1, 0) is maintained. This processing is repeated for all data (step 1320).

Figure 14:
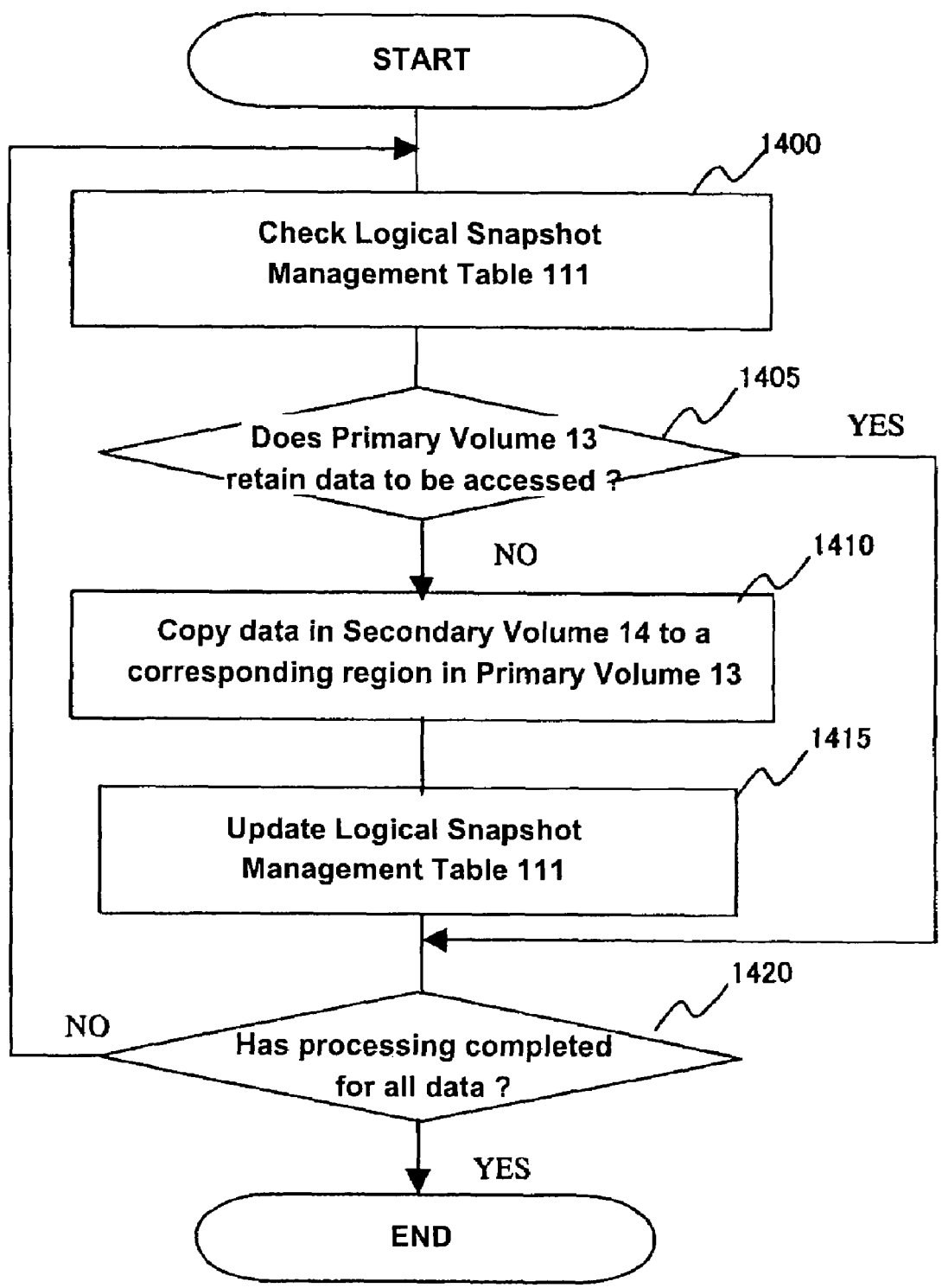
FIG. 14 shows a flowchart of a restore operation in accordance with an embodiment of the present invention.

After executing the restore command 260, data stored in a region in the state BM (P, S)=(1, 0) of the secondary volume 14 may be copied to the corresponding region of the primary volume 13 asynchronously with accesses from the host computer 2. This operation is described using FIG. 14.

As a result of executing the restore command 260, every region is in either the state BM (P, S)=(1, 0) or the state BM (P, S)=(0, 1). When the logical snapshot management table 111 is checked (step 1400), and data to be accessed is in the primary volume 13 (i.e., BM (P, S)=(0, 1)) (step 1405), the processing branches off to step 1420.

On the other hand, if there is no data to be accessed in the primary volume 13 (BM (P, S)=(1, 0)) (step 1405), since valid data must be retained in the corresponding region of the secondary volume 14, the data is copied to the applicable region of the primary volume 13 (step 1410). Next, the logical snapshot management table 111 is updated to BM (P, S)=(0, 0) (step 1415). This processing is repeated for all data (step 1420).

Through this copy operation, all data in the primary volume 13 becomes significant data, regardless of whether there has been any access from the host computer 2.

Based on the above, if the immediately preceding control command was the snap command 240, the data that was in the primary volume 13 at the time the snap command 240 was executed is guaranteed to be available for access to the secondary volume 14; and if the immediately preceding control command was the restore command 260, the data that was in the secondary volume 14 at the time the restore command 260 was executed is guaranteed to be available for access to the primary volume 13. Further, after the execution of the snap command 240, the updated data in the secondary volume 14 is given priority over data stored in the secondary volume 14 as a result of the execution of the snap command 240; after the execution of the restore command 260, the updated data in the primary volume 13 is given priority over the data copied to the primary volume 13 when the restore command 260 was executed.

In other words, in the above situations, the data at the time the respective commands were executed is overwritten by updated data, which means that the data at the time the respective commands were executed is not guaranteed.

Figure 16:
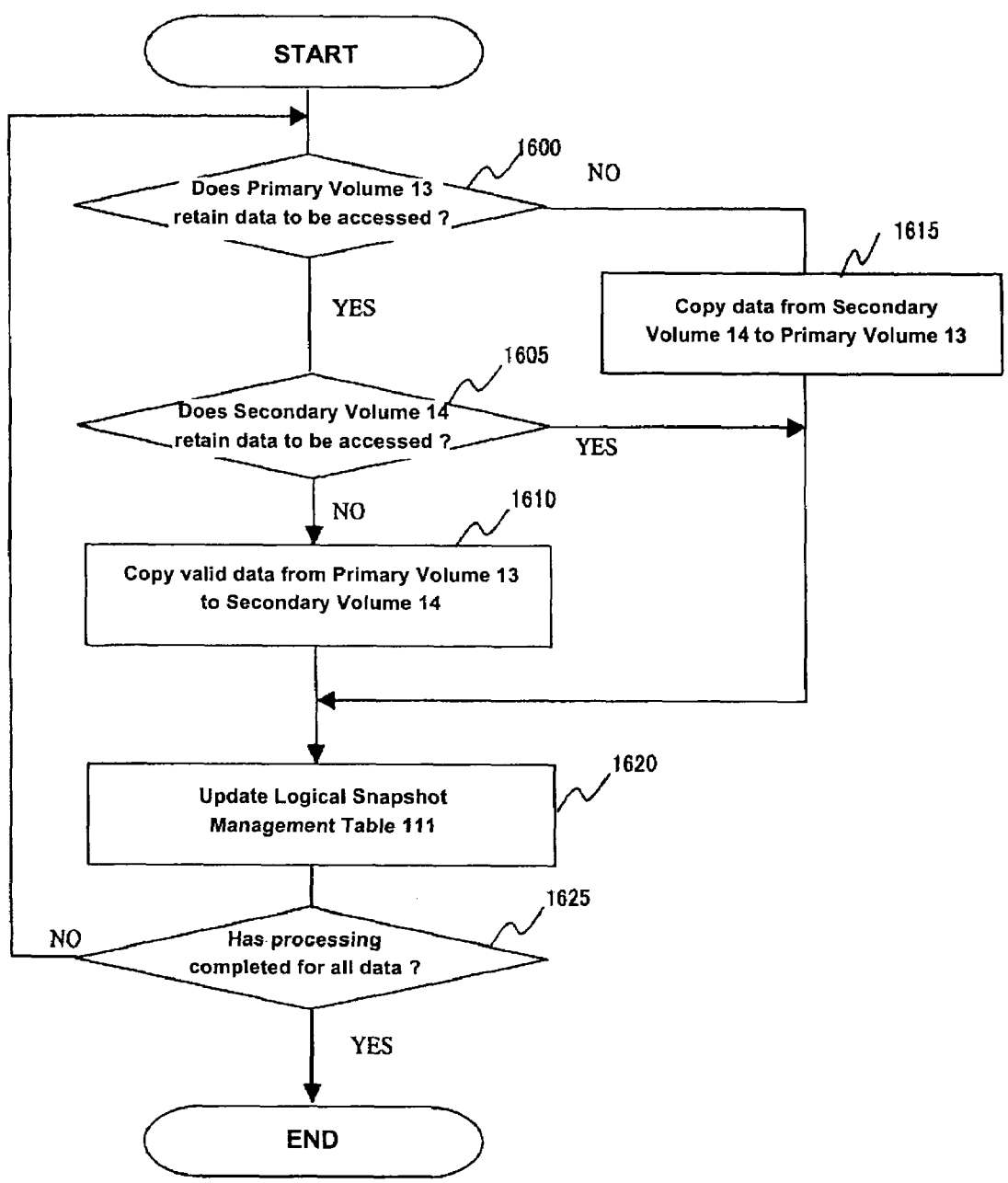
FIG. 16 shows a flowchart of a delete operation in accordance with an embodiment of the present invention.

The following is a description of the delete command 270. As described earlier, the delete command 270 is a command to transfer from the snap state 220 to the simplex state 210 via the transitional deleting state 230. Receiving the delete command 270 does not change the logical snapshot management table 111. This state is shown in FIG. 15. FIG. 16 indicates a delete operation executed by the control unit 11.

Upon receiving the delete command 270, if there is no data to be accessed in the primary volume 13 (step 1600), the processing branches off to step 1615; on the other hand, if there is data to be accessed in the primary volume 13, whether the data to be accessed is also in the applicable region of the secondary volume 14 is checked (step 1605). If the data to be accessed is in the applicable region of the secondary volume 14, the processing branches off to step 1620. On the other hand, if there is no data to be accessed in the applicable region of the secondary volume 14, data is copied from the primary volume 13 to the secondary volume 14 (1610). In step 1615, the data in the secondary volume 14 is copied to the corresponding region of the primary volume 13. In step 1620, since both the primary volume 13 and the secondary volume 14 have the data to be accessed, the logical snapshot management table 111 is updated to BM (P, S)=(0, 0). This processing is repeated for all data (step 1625).

If the management by the logical snapshot management table 111 is unnecessary due to the fact that the current state is the simplex state 210, step 1620 in FIG. 16 can be omitted by managing processed addresses with pointers.

It has been discussed earlier that the deleting state 230 may be made into a state that is not transitional; by making this state of the storage apparatus 1 ascertainable by the host computer 2 and by providing a new command, the status of the storage apparatus 1 can be transferred from the non-transitional deleting state 230 to the simplex state 210. In this situation, while keeping the details as they are in the snap state 220, the general state is transferred to the deleting state 230. By storing in the memory that the storage apparatus 1 is in the deleting state 230, the control unit 11 can recognize the difference between the deleting state 230 and the snap state 220. Further, the control unit 11 reports as necessary to the host computer 2 and/or the management apparatus 3 when it is in the deleting state 230. The following is a description of a method to transfer to the simplex state 210 in response to an access from the host computer 2 to the primary volume 13 or the secondary volume 14 while in the deleting state 230.

The change that takes place in this situation in the logical snapshot management table 111 is as shown in FIG. 5, which has already been described. The logical snapshot management table 111 must be in the state BM (P, S)=(0, 0) immediately before the status transfers to the simplex state 210; according to FIG. 5, a change to the state BM (P, S)=(0, 0) does not take place when a read instruction is issued to the primary volume 13 in the state BM (P, S)=(0, 1) and when a read instruction is issued to the secondary volume 14 in the state BM (P, S)=(1, 0). When there is such data, the storage apparatus 1 maintains the deleting state 230 and transfers to the simplex state 210 with the execution of an access that causes a change to the state BM (P, S)=(0, 0).

Through the first embodiment example, an access to a frozen image (snapshot) of data can be made immediately after the execution of the snap command 240. Further, due to the fact that a frozen image of all data is maintained either as a logical snapshot (i.e., a state in which the secondary volume 14 does not have the data) or as a physical snapshot (i.e., a state in which the secondary volume 14 has the data), accesses from the host computer 2 to the primary volume 13 are not restricted by accesses to the secondary volume 14.

Furthermore, even if an error occurs in data in the primary volume 13, data in the secondary volume 14 can be used to recover the data in the primary volume 13 by executing the restore command 260. Since the restore command 260 provides a symmetrical control to the snap command 240, it provides the host computer 2 the freedom to reverse the roles of the primary volume 13 and the secondary volume 14.

Due to the fact that, with the issuing of the delete command 270 from the host computer 2, the primary volume 13 and the secondary volume 14 transfer to the simplex state 210, in which each volume has data and can be used independently, usefulness of each volume is enhanced.

When storing backup data, the storage method varies depending on the purpose. For monthly backups or backups whose storage period is over a year, the backup data must be stored on magnetic tapes. On the other hand, temporary backups for recovery from data error are executed every ten minutes or every hour. In such cases, a storage medium such as a magnetic tape does not have to be provided, and instead the secondary volume 14 in the simplex state 210 according to the present embodiment example can be used as a backup storage. By writing the next backup data over a backup of a certain point in time in the secondary volume 14, the need to expand the storage capacity for backup is eliminated according to the present embodiment example. When a failure occurs on the secondary volume 14 while writing over backup data, the data could become irrecoverable; to avoid such situations, two secondary volumes 14 can be provided and used alternately.

The following is a description of the second embodiment example according to the present invention. According to the first embodiment example, the delete command 270 is executed in order to transfer from the snap state 220 to the simplex state 210. However, once the status transfers to the simplex state 210, there are many uses in which data in the secondary volume 14 is not used. A typical example is a situation in which the data in the secondary volume 14 is not used after data backup is completed in the snap state 220. For such a use, data copying that occurs with the execution of the delete command 270 is unnecessary. As a result, in the first embodiment example, time may be spent on unnecessary data copying.

Figure 17:
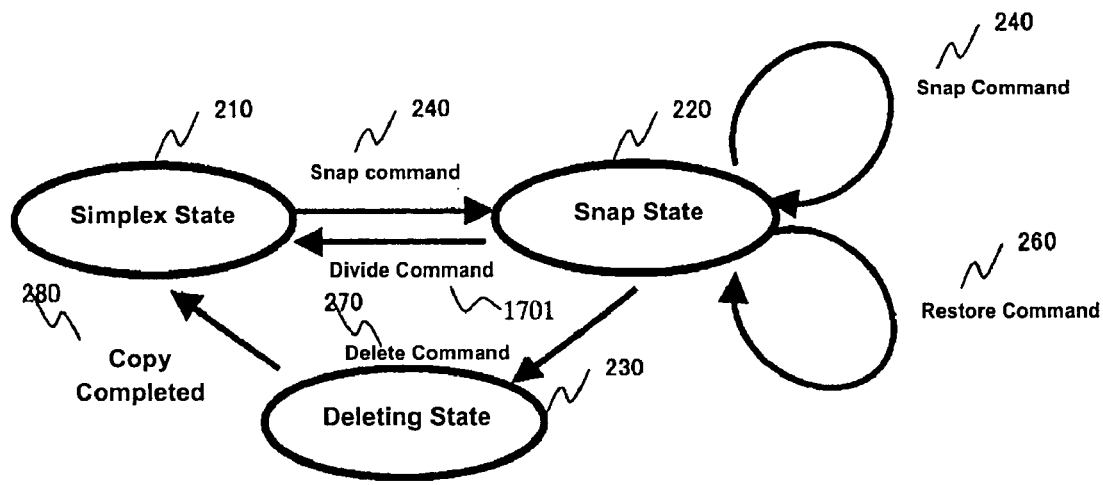
FIG. 17 shows a diagram of status transfer between states available to a storage apparatus in accordance with an embodiment of the present invention.

In view of this, a divide command 1300, which is different from the delete command 270 and which dissolves in a short period of time a pair arrangement between the primary volume 13 and the secondary volume 14 without having to perform data copying, is provided according to the second embodiment example, as shown in FIG. 17. The transfer to the simplex state 210 requires only that the host computer 2 recognizes that the storage apparatus 1 has transferred to the simplex state 210; in terms of the processing of the divide command 1300 by the control unit 11, the logical snapshot management table 111 is released and a report is made to the host computer 2.

According to the present embodiment example that provides the divide command 1300, the storage apparatus 1 can be transferred from the snap state 220 to the simplex state 210 in a short period of time.

When accesses to the secondary volume 14 in the snap state 220 are limited to read instructions, such as when making data backup, being able to dissolve pair arrangements in a short period of time as in the present embodiment example is extremely useful.

When using the divide command 1300 instead of the delete command 270, the capacity of the secondary volume 14 can be smaller than the capacity of the primary volume 13. The capacity of the secondary volume 14 can be appropriately determined by using a statistical method that takes the purpose of the secondary volume 14 into account.

Figure 18:
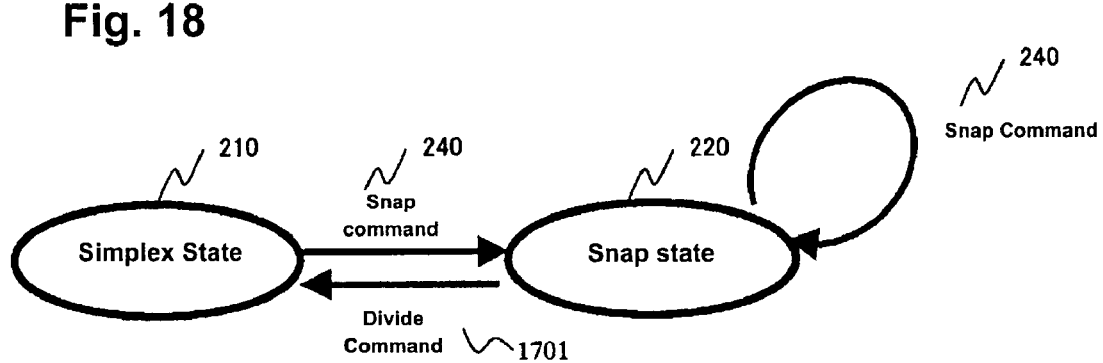
FIG. 18 shows a diagram of status transfer between states available to a storage apparatus in accordance with an embodiment of the present invention.

When the first embodiment example and the second embodiment example are considered in combination, the transfer from the snap state 220 to the simplex state 210 can be achieved by three control modes, i.e., using one or the other of the delete command 270 and the divide command 1300, and using both. FIG. 18 shows an example in which only the divide command 1300 is used.

The selection of such control modes depends on the role and/or function of the host computer 2, as illustrated in several examples. When the role and/or function of the host computer 2 is determined in advance, the storage apparatus 1 simply needs to have a specific control mode that corresponds to such role and/or function; however, the control mode required often changes over time. In view of this, the control mode can be made selectable by the host computer 2. Although a command to designate a control mode can be provided as a method for the host computer 2 or the management apparatus 3 to select a control mode, such a control mode selection function is added as a parameter of the snap command 240 according to the present embodiment example. The control unit 11 stores the parameter in its memory and executes controls as it refers to the parameter.

Due to the fact that the selection of the control mode is up to a user who uses the host computer 2, the user can use a storage apparatus favorable for the purpose and/or function of the host computer 2.

As described above, according to a storage apparatus and its control method of the present invention, frozen images can be used and obtained optimally according to the usage environment of a host computer, which enhances the convenience of the storage apparatus.

What is claimed is:

1. A storage apparatus that operates in response to commands from a computer, the storage apparatus comprising:
   a storage region; and
   a control unit that operates in response to a first command that snaps a first storage region in the storage region and a second storage region in the storage region into a snap state in which said first and second storage regions form a pair having a master-slave control relationship, and while said first and second storage regions are in said snap state, allows copying of data from the first storage region to the second storage region in response to a read instruction to read the data in the second storage region, and in response to a second command that dissolves the snap state between the first storage region and the second storage region.

2. A storage apparatus according to claim 1, wherein, when controlling the copying of data, the control unit reads data from the first storage region, outputs the data read to the computer, and then writes the data to the second storage region.

3. A storage apparatus according to claim 1, wherein, when there is data copied from the first storage region to the second storage region, the control unit invalidates the data in response to the first command.

4. A storage apparatus according to claim 1, wherein the first command is a command that allows copying of data from the first storage region to the second storage region in response to a write instruction to the second storage region.

5. A storage apparatus according to claim 4, wherein the control unit writes data designated by the write instruction on the data copied to the second storage region.

6. A storage apparatus according to claim 5, wherein the control unit controls in response to the second command to copy the data designated by the write instruction and written in the second storage region to the first storage region.

7. A storage apparatus according to claim 4, wherein the control unit controls the storage apparatus, in response to the second command, to copy the data from the first storage region to a region in the second storage region where data has not been copied from the first storage region.

8. A storage apparatus according to claim 1, wherein the control unit controls the storage apparatus, in response to the second command, to copy the data from the first storage region to a region in the second storage region where data has not been copied from the first storage region.

9. A storage apparatus according to claim 1, wherein the control unit generates, in response to the first command, management information to manage the snap state between the first storage region and the second storage region, and to release the management information in response to the second command.

10. A storage apparatus according to claim 1, wherein the control unit includes a control module that is responsive to a third command to control copying data from the first storage region to a region of the second storage region where data has not been copied from the first storage region, and to control dissolving the snap state between the first storage region and the second storage region.

11. A storage apparatus according to claim 10, wherein the control unit is responsive to the second command and the third command selectively issued from the computer.

12. A storage apparatus that operates in response to commands from a computer, the storage apparatus comprising:
a storage region; and
a control unit that operates in response to a first command that causes a first storage region within the storage region to enter a snap state with a second storage region within the storage region, wherein in said snap state said first and second storage regions form a pair having a master-slave control relationship; that while said first and second storage regions are in said snap state, allows copying of data from the first storage region to the second storage region in response to a read instruction to read the data in the second storage region; allows in response to a write instruction to the second storage region, writing of data instructed in the write instruction to the second storage region; and controls copying the data written in the second storage region to the first storage region.

13. A storage apparatus according to claim 12, wherein, when controlling the copying of the data in response to the read instruction, the control unit reads the data from the first storage region, outputs the data read to the computer, and then writes the data read in the second storage region.

14. A storage apparatus according to claim 12, wherein the control unit controls the copying of the data written in the first storage region in response to a second command.

15. A storage apparatus according to claim 12, wherein the control unit controls in response to the first command copying of data of the first storage region to the second storage region designated by the write instruction before writing the data designated by the write instruction.

16. A storage apparatus according to claim 12, wherein, when there is data in the second storage region that has been copied from the first storage region, the control unit controls in response to the first command to invalidate the data that has been copied.

17. A storage apparatus according to claim 12, wherein the control unit is responsive to a third command to control dissolving of the snap state between the first storage region and the second storage region.

18. A storage apparatus according to claim 17, wherein the control unit generates, in response to the first command, management information to manage the snap state between the first storage region and the second storage region, and dissolves the management information in response to the third command.

19. A storage apparatus comprising:
a storage region; and
a control unit that controls transfer between a first control state, that snaps a first storage region within the storage region to a second storage region within the storage region into a snap state in which said first and second storage regions form a pair having a master-slave control relationship, and while said first and second storage regions are in said snap state, allows copying of data from the first storage region to the second storage region in response to a read instruction to read the data in the second storage region; and a second control state, that dissolves the snap state between the first storage region and the second storage region.

20. A storage apparatus according to claim 19, wherein, when controlling the copying of data, the control unit reads data from the first storage region, outputs the data read to a host computer, and then writes the data to the second storage region.

21. A storage apparatus according to claim 19, wherein the control unit controls, in the first control state, in response to a write instruction to the second storage region, to allow copying of data from the first storage region to the second storage region.

22. A storage apparatus according to claim 19, wherein, when transferring from the first control state to the second control state, the control unit controls copying of data from the first storage region to a region in the second storage region where data has not been copied from the first storage region.

23. A storage apparatus according to claim 19, wherein, when transferring from the first control state to the second control state, the control unit controls copying of data from the second storage region to a region in the first storage region where data has not been copied from the second storage region.

24. A storage apparatus according to claim 19, wherein, when transferring from the first control state to the second control state, the control unit generates management information to manage the snap state between the first storage region and the second storage region, and when transferring from the second control state to the first control state, the control unit releases the management information.

25. A method for managing a storage apparatus having a storage region, the method comprising the steps of:
in response to a first command from a computer, snapping a first storage region in the storage region and a second storage region in the storage region into a snap state in which said first and second storage regions form a pair having a master-slave control relationship, and while said first and second storage regions are in said snap state, copying data from the first storage region to the second storage region in response to a read instruction from the computer to read the data in the second storage region; and in response to a second command, dissolving the snap state between the first storage region and the second storage region.

26. A method for managing a storage apparatus according to claim 25, wherein the step of copying the data comprises the steps of reading data from the first storage region, outputting the data read to the computer, and then writing the data read to the second storage region.

27. A method of managing a storage apparatus according to claim 25, wherein, when there is data in the second storage region that has been copied from the first storage region, the data is invalidated in response to the first command.

28. A method of managing a storage apparatus according to claim 27, wherein, in response to a write instruction to the second storage region, data is copied from the first storage region to the second storage region.

29. A method of managing a storage apparatus according to claim 28, wherein data designated by the write instruction is written on the data copied to the second storage region.

30. A method of managing a storage apparatus according to claim 29, wherein, in response to the second command, the data designated by the write instruction and written in the second storage region is copied to the first storage region.

31. A method of managing a storage apparatus according to claim 29, wherein, in response to the second command, the data is copied from the first storage region to a region in the second storage region where data has not been copied from the first storage region.

32. A method of managing a storage apparatus according to claim 25, wherein, in response to the second command, the data is copied from the first storage region to a region in the second storage region where data has not been copied from the first storage region.

33. A method of managing a storage apparatus according to claim 25, wherein management information to manage the snap state between the first storage region and the second storage region is generated in response to the first command, and the management information is released in response to the second command.

34. A method of managing a storage apparatus according to claim 25, wherein the control unit copies data from the first storage region to a region of the second storage region where data has not been copied from the first storage region, and dissolves the snap state between the first storage region and the second storage region in response to a third command.

35. A method of managing a storage apparatus according to claim 34, further comprising the step of responding to the second command and the third command selectively issued from the computer.

36. A method for managing a storage apparatus having a storage region, the method comprising the steps of:

snapping a first storage region within the storage region and a second storage region within the storage region into a snap state in which said first and second storage regions form a pair having a master-slave control relationship;

in response to a read instruction from a computer to read data in the second storage region, and while said first and second storage regions are in said snap state, copying the data from the first storage region to the second storage region;

in response to a write instruction from the computer to the second storage region, writing data instructed in the write instruction to the second storage region; and copying the data written in the second storage region to the first storage region.

37. A method for managing a storage apparatus according to claim 36, wherein the step of copying the data comprises the steps of: reading the data from the first storage region, outputting the data read to the computer, and then writing the data read in the second storage region.

38. A method for managing a storage apparatus according to claim 36, wherein the step of copying the data written to the first storage region is executed in response to a command from the computer.

39. A method for managing a storage apparatus according to claim 36, wherein, before writing the data designated by the write instruction, data of the first storage region is copied to the second storage region designated by the write instruction.

40. A method for managing a storage apparatus according to claim 36, further comprising the step of controlling, in response to a command from the computer, when there is data in the second storage region that has been copied from the first storage region, to invalidate the data.

41. A method for managing a storage apparatus according to claim 36, wherein the snap state between the first storage region and the second storage region is dissolved in response to a command from the computer.

42. A method for managing a storage apparatus according to claim 41, wherein the step of snapping the first storage region to the second storage region includes the step of generating management information to manage the snap state between the first storage region and the second storage region, wherein the management information is released in response to the command.

43. A method for managing a storage apparatus having a storage region, the method comprising the steps of:

controlling transfer between a first control state in which a first storage region within the storage region and a second storage region within the storage region are snapped into a snap state in which said first and second storage regions form a pair having a master-slave control relationship, and a second control state in which the snap state between the first storage region and the second storage region is dissolved; and in the first control state, in response to a read instruction to read data in the second storage region, copying the data from the first storage region to the second storage region.

44. A method for managing a storage apparatus according to claim 43, wherein the step of copying the data includes the steps of reading the data from the first storage region, outputting the data read to a host computer, and then writing the data read to the second storage region.

45. A method for managing a storage apparatus according to claim 43, wherein, in the first control state, in response to a write instruction to the second storage region, data is copied from the first storage region to the second storage region.

46. A method for managing a storage apparatus according to claim 43, wherein, when transferring from the first control state to the second control state, data is copied from the first storage region to a region in the second storage region where data has not been copied from the first storage region.

47. A method for managing a storage apparatus according to claim 43, wherein, when transferring from the first control state to the second control state, data is copied from the second storage region to a region in the first storage region where data has not been copied from the second storage region.

48. A method for managing a storage apparatus according to claim 43, wherein, when transferring from the first control state to the second control state, management information to manage the snap state between the first storage region and the second storage region is generated, and when transferring from the second control state to the first control state, the management information is released.

49. A storage apparatus comprising:
a storage region, wherein a first storage region within the storage region and a second storage region within the storage region are snapped into a first snap state in which said first and second storage regions form a pair having a master-slave control relationship, and the first storage region and the second storage region are controlled with the snap state therebetween being dissolved in a second state; and
a control unit that selectively executes a first control mode which dissolves the snap state in order to transfer from the snap state to the second state and a second control mode which dissolves the snap state after copying data in the first storage region to the second storage region.

50. A storage apparatus comprising:
a storage region, wherein a first storage region within the storage region and a second storage region within the storage region are snapped into a first snap state in which said first and second storage regions form a pair having a master-slave control relationship, and the first storage region and the second storage region are controlled with the snap state therebetween being dissolved in a second state; and
a control unit that selectively executes a first control mode which dissolves the snap state in order to transfer from the snap state to the second state and a second control mode which dissolves the snap state after copying data in the second storage region to the first storage region.

51. A storage apparatus comprising:
a storage region;
a memory storing management information; and
a control unit that commonly uses the management information stored in the memory as control information for managing a snap state between a first storage region within the storage region and a second storage region within the storage region in which said first and second storage regions form a pair having a master-slave control relationship, and as control information for managing the snap state of a data status resulting from accesses to data in the first storage region with a data status resulting from accesses to data in the second storage region, and manages the first storage region and the second storage region that store the data.

* * * * *